July 6, 1943. J. WALTON 2,323,693
AIRPLANE FLIGHT LEVEL INDICATOR
Filed May 17, 1941 2 Sheets-Sheet 1

Inventor
Jack Walton
By Watson E. Coleman
Attorney

July 6, 1943. J. WALTON 2,323,693
AIRPLANE FLIGHT LEVEL INDICATOR
Filed May 17, 1941 2 Sheets-Sheet 2
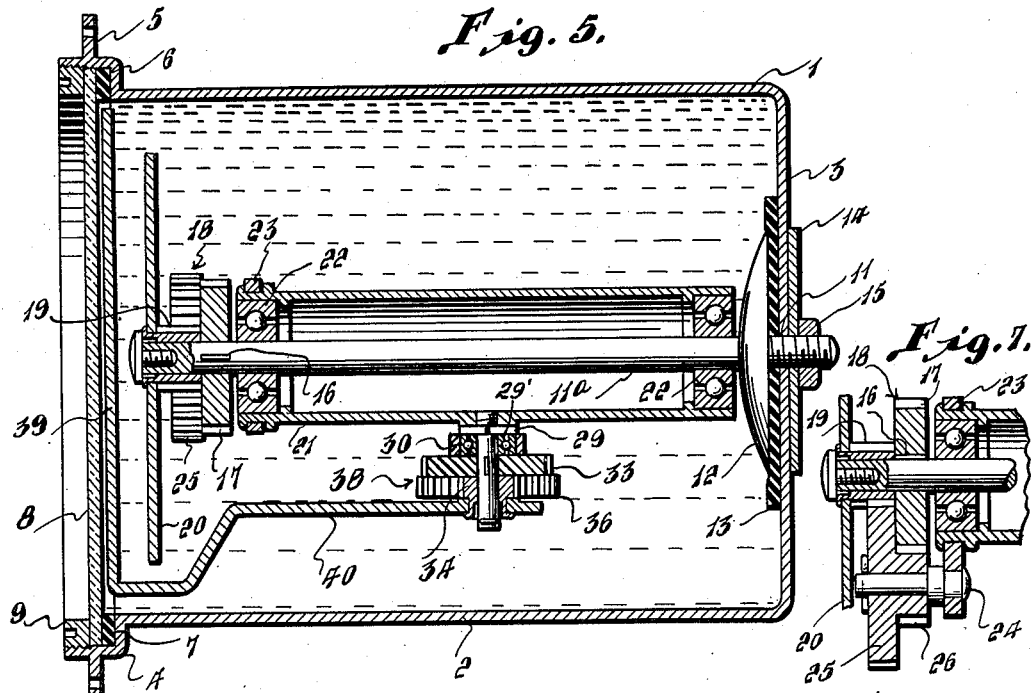
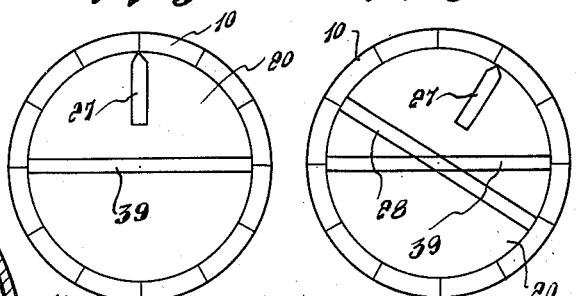
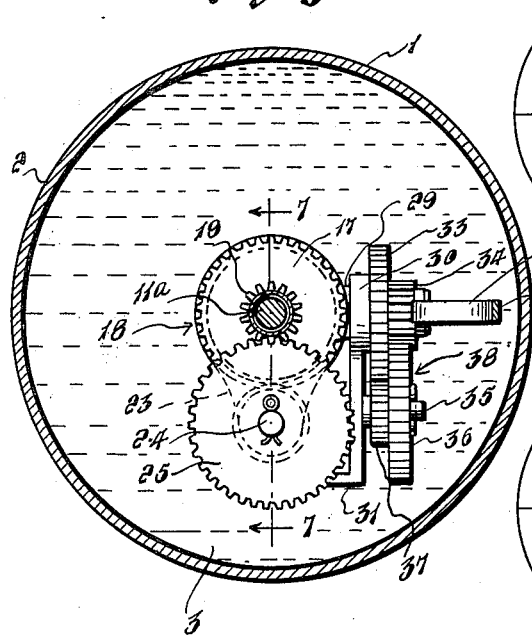
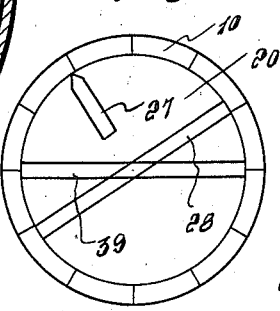
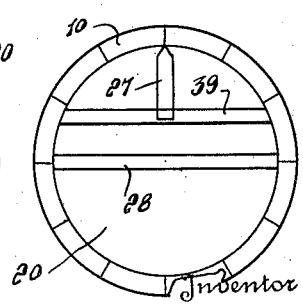
Inventor
Jack Walton
By Watson E. Coleman
Attorney Patented July 6, 1943

2,323,693

UNITED STATES PATENT OFFICE 2,323,693

AIRPLANE FLIGHT LEVEL INDICATOR

Jack Walton, Tampa, Fla.

Application May 17, 1941, Serial No. 394,010

9 Claims. (Cl. 33—215)

This invention relates to an aircraft instrument designed to indicate when the aircraft is traveling a level course and to designate promptly and accurately the deviation of the craft from such course as in turning or traveling upwardly or downwardly.

The primary object of the present invention is to provide a flight level indicator instrument of the character stated which is of novel construction whereby it will respond instantly to deviations of the aircraft from the horizontal so as to give an accurate indication of the movement of the plane in a climb or glide and indicate the degree of bank when the plane is turning to the right or to the left.

Another object of the invention is to provide an instrument of the character stated wherein the construction and arrangement of the parts is such that the instrument will be extremely sensitive to changes in the movement of the aircraft in flight for giving the indication stated but wherein the construction and arrangement of the parts is also such as to prevent the instrument from giving false information when the craft is subjected to jars and vibrations such as might result from traveling in rough air.

The invention will be best understood from a consideration of the following detailed description taken in connection with the accompanying drawings, it being understood, however, that the invention is not to be considered as limited by the specific illustration or description but that such illustration and description constitutes a preferred embodiment of the invention.

In the drawings—

Fig. 5 is a horizontal longitudinal section taken on the line 5—5 of Fig. 2.

Fig. 6 is a transverse section on the line 6—6 of Fig. 2.

Fig. 7 is a detailed section on the line 7—7 of Fig. 6.

Fig. 8 illustrates diagrammatically the position of the indicators of the instrument during straight ahead horizontal flight.

Fig. 9 is a diagrammatic view illustrating a left bank.

Fig. 10 is a diagrammatic view illustrating a right bank.

Fig. 11 is a diagrammatic view illustrating the position of the instrument indicators in a glide or dive.

Figure 1:
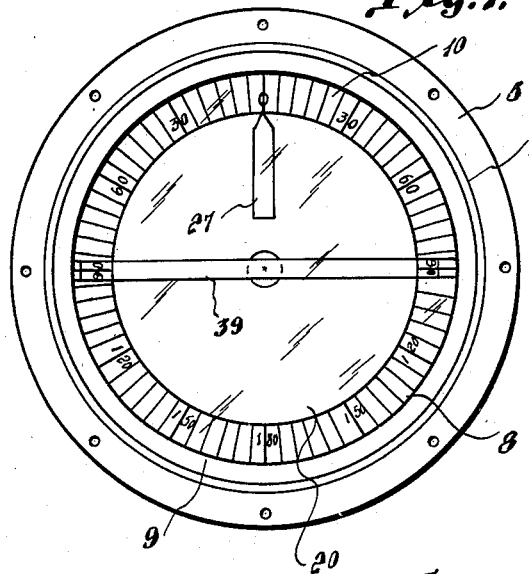
Fig. 1 is a view in front elevation of the instrument embodying the present invention.
Figure 3:
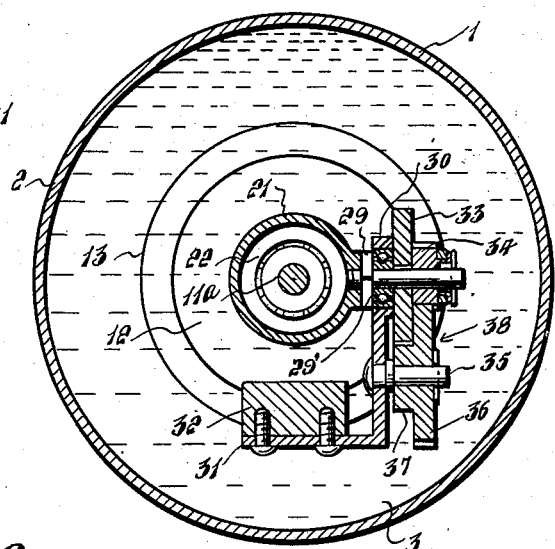
Fig. 3 is a transverse section on the line 3—3 of Fig. 2.
Figure 2:
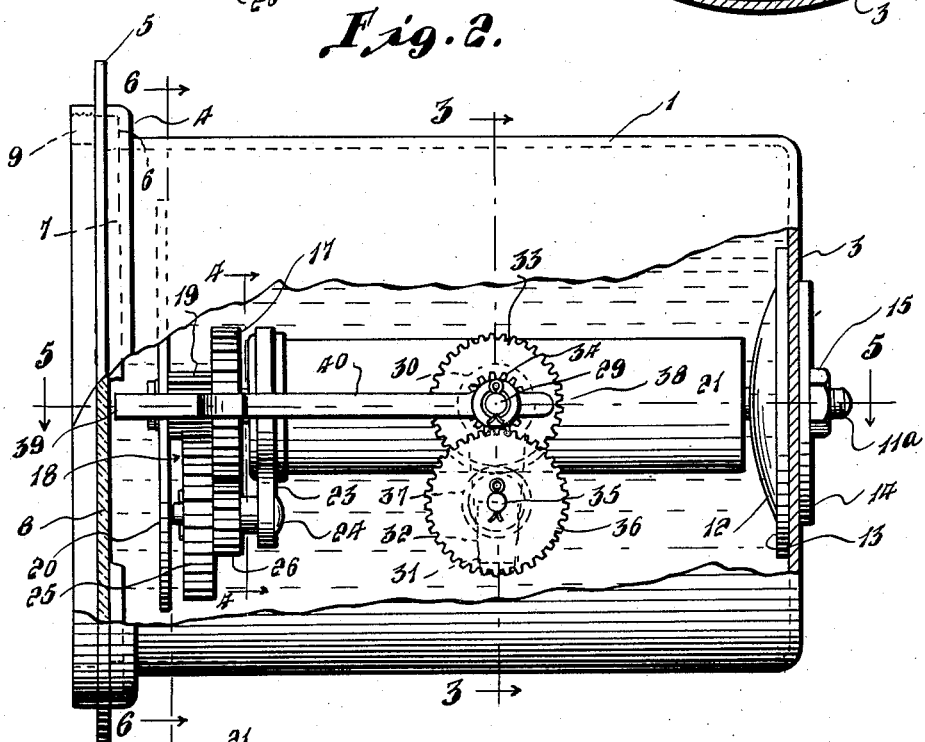
Fig. 2 is a view in side elevation of the instrument with a portion of the casing being broken away to show interior features of construction.
Figure 4:
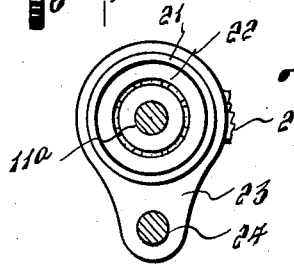
Fig. 4 is a sectional view on the line 4—4 of Fig. 2.

Referring now more particularly to the drawings, the numeral 1 generally designates the casing for the present instrument which is mounted firmly or rigidly upon the instrument panel of the aircraft in a suitable manner. The casing is here illustrated as being of circular form having the side wall 2, the rear wall 3 and at its forward end, an offset encircling rim 4 which is integral with a lateral encircling flange 5 by means of which the front end of the casing can be secured to the instrument panel or other suitable support. By offsetting the rim 4 as shown, a shoulder 6 is provided against which is fitted the ring gasket 7. The inner face of the rim is screw-threaded and there is fitted in the front end of the casing to close the same and position upon the gasket 7, the glass face or front 8 which is secured firmly in position by the locking ring 9 which has threaded connection with the rim, as shown, and presses the glass front firmly against the gasket. This construction is provided to prevent the leakage from the casing of the damping fluid with which the casing is filled and which functions to damp the movements of the hereinafter described movable parts of the instrument.

The glass face 8 carries the annular dial 10 adjacent its periphery and this dial is laid off in degrees as shown in Fig. 1.

The back wall 3 of the casing is provided with a central aperture 11 and through this aperture there extends the threaded rear end of a main shaft 11a which is fixed against movement, either rotary or axial in the casing, and which extends forwardly and terminates in spaced relation with the glass face 8. The rear end of the shaft 11a has fixed thereto a concave washer 12 which is disposed upon the inner side of the wall 3 and encircling this shaft and interposed between this washer and the wall 3 is a gasket 13 against which the washer bears. Upon the outer side of the wall 3, the shaft carries the flat washer 14 and a nut 15 which functions to draw the two washers toward one another so as to establish through the medium of the gasket 13, a fluid-tight joint between the shaft and the wall 3.

The forward end of the main shaft 11a is squared or carries a locking key, as indicated at 16, to have fixed thereto a stationary gear 17 which forms one of a train of gears which is generally indicated by the numeral 18, and forwardly of the key 16 of the main shaft, the shaft is of circular form to support for rotary movement, a small idler gear 19 to which is fixed a rotary dial 20 which turns about the main shaft with the gear 19.

Rearwardly of the gear train 18, the main shaft is enclosed in the cylindrical housing 21 and the housing is rotatably supported on the main shaft by the anti-friction bearing units 22 which are mounted in its ends. At its forward end the housing 21 carries a depending arm 23 which supports the horizontal stud 24 on which are mounted for unitary rotation, the gear and pinion 25 and 26, respectively, which complete the gear train 18. The pinion 26 is in mesh with the stationary gear 17 while the gear 25 is in mesh with the pinion 19 which is connected with and turns with the dial 20.

The face of the dial 20 has thereon a pointer bar 27, the point of which is at the periphery of the dial and directed toward the zero point of the scale when the plane, in which the instrument may be mounted, is not making a turn and there is also disposed across the face of the dial, the radius bar 28 which, of course, turns with and on the axis of the dial when the latter rotates on the main shaft 11ª and cooperates with a hereinafter described part of the instrument structure to indicate when the plane or aircraft is climbing or gliding.

Upon one side of the cylinder housing 21 there is secured in a suitable manner as shown, a laterally projecting stud 29 which is at right angles to the depending arm 23. Swingingly supported upon the stud 29 on a suitable antifriction bearing 29' is a balance weight supporting arm 30 which extends a substantial distance below the housing and which carries at its lower end the right angled extension 31 which is directed under the housing and supports a balance weight 32. Upon the stud 29 there is fixed in any suitable manner upon the outer side of the arm 30 from the housing, a stationary gear 33, and coaxial with this gear there is mounted on the stud for rotation, a pinion 34.

The actuating arm 30 has fixed thereto the laterally extending stud 35 which is below and parallel with the gear supporting stud 29 and rotatably supported upon the arm stud 35 for unitary rotation are the gear and pinion 36 and 37, respectively, the pinion being in mesh with the fixed gear or stationary gear 33 and the gear 36 being in mesh with the pinion 34. These gears and pinions form a gear train which is designated as a whole by the numeral 38 which, when actuated by the balance weight, controls the movements of a horizon bar.

The horizon bar is indicated by the numeral 39 and at one end it has an arm 40 which is at right angles to the bar and which is fixed to the pinion 34 to turn therewith. The arm 40 parallels the fixed shaft 11ª when the aircraft in which the instrument is mounted is flying a straight horizontal course, and under these conditions the horizon bar which is at the forward end of the arm 40 and extends across the face of the dial 20 between the dial and the glass 8, is parallel with and covers the radius bar 28 of the rotating dial.

As previously stated, the casing 1 which is fluid-tight, is completely filled with a suitable clear damping fluid which not only has a damping action upon the movements of the parts, but also serves to keep the moving parts thoroughly lubricated.

Under conditions of flying where the plane is traveling straight ahead and is horizontal, the dial or face of the instrument will appear as in Figs. 1 and 8, where it will be seen that the pointer bar 27 is directed to the zero point at the top of the scale and the horizon or indicator bar covers the horizontal radius bar 28. When a right or a left turn is made, these will be shown by instrument as appears in Figs. 10 and 9, respectively. Upon the making of a right turn or bank, the pointer bar 27 will swing to the right and indicate the direction of bank or turn and upon making a left turn, the opposite action occurs, so that the pilot can see instantly the direction of lateral inclination of the plane. The horizontal indicator bar 39 will under these conditions remain horizontal, indicating that the plane is maintaining a level longitudinal position. However, if the plane should be traveling upwardly in a climb or downwardly in a glide, the horizon bar will move accordingly, that is, if the plane is climbing, the horizon bar will drop below the radius bar 28 of the rotating dial in the same manner that the true horizon will apparently drop below the horizontal axis or the nose of the aircraft, and if the aircraft is in a glide, then the horizon bar will rise above the radius bar 28 of the rotating dial in the same manner that the true horizon appears to rise when the plane or aircraft is nosed downward and this latter movement of the craft, assuming that it is traveling straight ahead, will be shown by the instrument as illustrated in Fig. 11. Of course, if the craft is turning to the right or to the left in a bank at the same time that it is gliding or climbing, then a compound movement of the parts involving the horizon bar and the bank indicator bar 27 and the radius bar 28 will, of course, occur, so that two indications will be given designating these movements.

The gear trains 18 and 38 serve a multiple purpose in that they speed up the indicators so that the instrument is sensitive; they serve as dampeners to prevent the indicators from swinging or rocking due to rough air, and the number of gears in the trains can be varied as desired, to either increase or decrease the degree of sensitivity of the instrument.

The rotating dial may have the bank indicator bar 27 and the radius bar 28 painted or etched on its face or formed in any other suitable manner and the degree marks of the scale 10 may be etched or otherwise suitably applied to the glass face 8 around the peripheral portion so as to leave the center clear to permit the proper observation of the rotating dial and movements of the horizon indicator bar in relation thereto.

It will, of course, be understood that the cylindrical housing 21 in effect maintains a steady position when the plane is making a right or left turn while the casing 1 turns thereabout. By this action, the necessary turning movement is imparted through the bear 17 to the remaining gears of this gear train to bring about the desired rotation of the rotary dial and movement of the bank indicator bar. Likewise, when the plane or aircraft is gliding or climbing, the tendency of the balance weight and arm to remain in position or, in other words, the inertia of these parts, effects the desired rotation of the gear 33 which turns with the stud 29, thereby imparting rotary movement to the remaining gears of this gear train 38 so as to bring about the up and down oscillatory movement of the horizon bar arm 40 to effect the consequent movement of the horizon bar vertically across the face of the rotary dial 20, thereby indicating the angle of the longitudinal axis of the aircraft with respect to the horizontal.

While it has been stated above that the balance weight with the other parts tends through inertia to effect the desired rotation of the gears, this weight also is provided to perform another important function. The gear train 38 would tend to pull the housing to one side by its weight and the balance weight on the arm 30 is provided to counteract this tendency and to center the mechanism.

Reference has been made to the bank indicator designating the degree of right or left bank of the plane in making turns, but it will also be readily apparent to those versed in the art that the bank indicator will also function if the aircraft in which the instrument is mounted is flying a perfectly straight or horizontal course, but has its right or left wing lower than the other wing. Thus it will be seen that the indicator not only shows the degree of bank when the plane is actually flying a curved course, but it will indicate when the tips of the wings are one higher than the other.

While the instrument has been illustrated in Fig. 1 as having a circular securing or attaching flange 5, it is to be understood that this flange may be of any desired contour so as to provide an attractive frame for the dial. Also while certain of the gears have been shown as secured to their respective shafts by cotter keys, it is contemplated to use other types of securing means such, for example, as the well known jump rings which fit into circular grooves cut around the shafts. Also it is to be understood that while keys have been illustrated for securing the fixed gears to their respective shafts, these gears may be secured by being threaded upon the shafts or by being soldered thereto as may be desired.

The degree marks on the stationary dial 10 will vary, depending on the number of gears used in the instrument and it will, of course, be obvious that the degree bars and figures will be made as large as possible for easy reading.

What is claimed is:

1. A flight level indicator, comprising a supporting structure designed to be rigidly secured to an aircraft, a dial carried by the structure for rotation on its radial center, an annular scale fixed relative to and concentric with the dial, said dial carrying a pointer coacting with the scale and having a radial bar outlined across the face thereof, a horizon bar disposed across the face of the dial parallel with the radial bar, means carried by the structure and operatively coupled with the dial for imparting rotational movement to the dial upon turning of the supporting structure on the axis of rotation of the dial at a differential rate with respect to turning of the structure, to indicate the direction of bank, and means carried by said structure and operatively coupled with said horizon bar for moving the latter out of alinement with the radius bar and in a direction transversely of the rotary axis of the dial upon oscillation of the structure on an axis transversely to the said axis of rotaton of the dial and at an accelerated rate with relation to the rate of oscillation of the structure on the stated transverse axis.

2. An aircraft flight level indicator, comprising a supporting structure designed to be rigidly secured to the aircraft to maintain a predetermined position with respect thereto, a dial carried by the supporting structure for rotation on its radial axis, a circular scale supported independently of the dial and coaxial therewith and maintaining a fixed position with respect thereto, said dial having a bank direction pointer for coaction with the scale and having a radial indicator across the face thereof, a balance weight suspended from said supporting structure and oscillatable with respect thereto in a plane extending transversely of the axis of rotation of the dial and in a plane extending longitudinally of said axis, a horizon bar supported for oscillation on an axis extending transversely of said dial axis and extending across the face of the dial in parallel relation with said radial indicator, and an operative connection between said balance weight and the dial and between said balance weight and the horizon bar for imparting differential rotary movement to the dial on its axis upon relative swinging of the weight with respect to the supporting structure transversely of the dial axis and for imparting differential movement to the horizon bar on its axis and across the face of the dial with respect to the radial indicator upon relative movement of the weight with respect to the supporting structure longitudinally of the dial axis.

3. A flight level indicator, comprising a dial supported for turning on its radial axis, an annular scale disposed in front of and coaxial with the dial and supported independently thereof to maintain a fixed relation with respect thereto, means carried by the dial forming a bank direction pointer cooperating with said scale, means carried by the dial forming a radial indicator across and fixed with respect to the face thereof, a balance weight supported for oscillation on an axis coincidental with the axis of turning of the dial and independently of the dial and for turning on an axis extending transversely of the first axis, a horizon bar disposed across the face of the dial in front of and parallel with the radial indicator and supported for turning on an axis coincident with the last-mentioned axis of turning for the weight and independently of the weight, an operative driving coupling between the weight and the dial by which rotary motion is imparted to the dial upon the turning of the weight on the first-mentioned axis therefor, and a driving coupling between the weight and the horizon bar by which turning is imparted to the horizon bar on its axis upon turning of the weight on the second-mentioned axis therefor.

4. A flight level indicator, comprising a dial supported for turning on its radial axis, an annular scale disposed in front of and coaxial with the dial and supported independently thereof to maintain a fixed relation with respect thereto, means carried by the dial forming a bank direction pointer cooperating with said scale, means carried by the dial forming a radial indicator across the face thereof, a balance weight supported for oscillation on an axis coincidental with the axis of turning of the dial and independently of the dial and for turning on an axis extending transversely of the first axis, a horizon bar disposed across the face of the dial parallel with the radial indicator and supported for turning on an axis coincident with the last-mentioned axis of turning for the weight and independently of the weight, an operative driving coupling between the weight and the dial by which rotary motion is imparted to the dial upon the turning of the weight on the first-mentioned axis therefor, and a driving coupling between the weight and the horizon bar by which turning is imparted to the horizon bar on its axis upon turning of the weight on the second-mentioned axis therefor, each of said driving couplings comprising a train of gears which are so constructed and arranged as to effect transmission of turning motion from the balance weight to the dial and horizon bar at a different rate from the turning of the weight about the turning axis therefor.

5. An aircraft flight level indicator, comprising a supporting structure designed to be rigidly secured to the aircraft for movement therewith and including a fixed shaft, a body supported for rotation on said shaft, a bank direction indicator including a dial supported for rotation on an axis coincident with said body and a scale secured to the structure, said dial having a pointer for coaction with the scale, said dial further including a radial indicator means across its face, a balance weight pivotally attached to said body upon one side thereof and suspended from the point of attachment beneath the longitudinal center of the body and having swinging movement on an axis extending perpendicular to the axis of rotation of the body, a horizon indicator supported for oscillation on the oscillation axis of the balance weight and disposed across said dial and in front of said radial indicator, a gear train operatively coupled between an end of said body on the shaft and said dial for imparting rotation to the dial on turning of the body about the shaft, and a gear train operatively coupled between the balance weight and the horizon indicator for transmitting swinging movement to the horizon indicator upon oscillation of the weight upon its axis.

6. An aircraft flight level indicator, comprising a casing adapted to be rigidly secured to the aircraft for movement therewith and a shaft rigidly supported within the casing, a cover glass closing an end of the casing, a body supported on the shaft for rotation thereabout, an arm extending downwardly from the body at the end adjacent the cover glass, a dial rotatably supported on said shaft between the said end of the body and the cover glass and including a radial indicator and a pointer adjacent its periphery, a circular scale upon said cover glass for coaction with said pointer, a gear train coupling said arm with said dial for rotating the latter upon turning of the body, a stud secured to the body and extending laterally therefrom perpendicular to the arm, a horizon bar disposed between said dial and the cover glass to overlie said radial indicator, said bar having an extension secured to said stud, a hanging arm swingingly supported from the stud and having a lower end extending beneath the body, a balance weight upon said extended lower end, and a gear train forming an operative connection between said hanging arm and the rearwardly extending portion of the horizon bar.

7. A flight indicator of the character stated comprising a supporting body designed to be rigidly secured to an aircraft, a dial mounted upon the body to turn about an axis passing through its radial center, an annular scale concentric with the dial and secured to the support, the dial having a radius bar across its face and a pointer for coaction with the scale, a single balance weight supported from the body for turning movement relative thereto on two intersecting perpendicular axes, a horizon bar supported to extend across the face of the dial and to assume a parallel relation with the radius bar, the horizon bar being adapted to oscillate on an axis perpendicular to the axis of turning of the dial, and differential speed gear trains interposed between the balance weight and the dial and horizon bar for transmitting an accelerated movement of the dial and horizon bar about their respective axes upon the relative turning of the supporting body and balance weight.

8. An aircraft flight level indicator, comprising a fixed support adapted to be secured rigidly to the supporting aircraft, a balance weight suspended from the support for swinging movement on two perpendicular intersecting axes, a bank direction indicating means comprising a portion supported for turning movement on one of said axes relative to a fixed second portion, a horizon indicator supported for turning movement on the other one of said axes relative to a face of the bank direction indicator, said horizon indicator having movement independently of and in front of a part of the face of said bank direction indicator for visual coaction therewith, an operative coupling between said balance weight and the first mentioned one of the portions of the bank direction indicator by which the said first one of the bank direction indicator portions is given turning movement relative to the other portion upon turning of the balance weight on the said one of the axes, and an operative coupling between the balance weight and the horizon indicator for imparting swinging movement to the horizon indicator about the other one of said axes relative to and in front of the said face of the bank direction indicator.

9. An aircraft flight level indicator, comprising a fixed support adapted to be secured rigidly to the supporting aircraft, a balance weight suspended from the support for swinging movement on two perpendicular intersecting axes, a bank direction indicating means comprising a portion supported for turning movement on one of said axes relative to a fixed second portion, a horizon indicator supported for turning movement on the other one of said axes relative to a face of the bank direction indicator, said horizon indicator having movement independently of and in front of a part of the face of said bank indicator for visual coaction therewith, an operative coupling between said balance weight and the first mentioned one of the portions of the bank direction indicator by which the said first one of the bank direction indicator portions is given turning movement relative to the other portion upon turning of the balance weight on the said one of the axes, and an operative coupling between the balance weight and the horizon indicator for imparting swinging movement of the horizon indicator about the other one of said axes relative to and in front of the bank direction indicator, each of said operative couplings comprising a multiplying gear train which functions as a movement dampener for the elements between which it is connected in addition to its function as a means of transmitting action.

JACK WALTON.